United States Patent
Lee et al.

(10) Patent No.: US 11,217,270 B2
(45) Date of Patent: Jan. 4, 2022

(54) TRAINING DATA GENERATING METHOD FOR TRAINING FILLED PAUSE DETECTING MODEL AND DEVICE THEREFOR

(71) Applicant: LG ELECTRONICS INC., Seoul (KR)

(72) Inventors: Yun Jin Lee, Seoul (KR); Jaehun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 16/809,443

(22) Filed: Mar. 4, 2020

(65) Prior Publication Data

US 2021/0193175 A1    Jun. 24, 2021

(30) Foreign Application Priority Data

Dec. 18, 2019  (KR) .......................... 10-2019-0169887

(51) Int. Cl.
*G10L 25/87* (2013.01)
*G10L 25/84* (2013.01)
(Continued)

(52) U.S. Cl.
CPC ............ *G10L 25/87* (2013.01); *G10L 15/063* (2013.01); *G10L 25/84* (2013.01); *G10L 2025/783* (2013.01)

(58) Field of Classification Search
CPC ....... G10L 25/87; G10L 15/063; G10L 25/84; G10L 2025/783
(Continued)

(56) References Cited

U.S. PATENT DOCUMENTS 5,848,388 A * 12/1998 Power .................... G10L 17/02
704/239
8,244,523 B1 * 8/2012 Murphy .................. G10L 25/84
704/205
(Continued)

OTHER PUBLICATIONS

J. Ogata, M. Goto and K. Itou, "The use of acoustically detected filled and silent pauses in spontaneous speech recognition," 2009 IEEE International Conference on Acoustics, Speech and Signal Processing, 2009, pp. 4305-4308, doi: 10.1109/ICASSP.2009.4960581. (Year: 2009).*
(Continued)

*Primary Examiner* — Bharatkumar S Shah
(74) *Attorney, Agent, or Firm* — Lee Hong Degerman Kang & Waimey (57) ABSTRACT

Disclosed is a method for generating training data for training a filled pause detecting model and a device therefor, which execute mounted artificial intelligence (AI) and/or machine learning algorithms in a 5G communication environment. The method includes acquiring acoustic data including first speech data including a filled pause, second speech data not including a filled pause, and noise, generating a plurality of noise data based on the acoustic data, and generating first training data including a plurality of filled pauses and second training data not including a plurality of filled pauses by synthesizing the plurality of noise data with the first speech data and the second speech data. According to the present disclosure, training data for training a filled pause detecting model in a simulation noise environment can be generated, and filled pause detection performance for speech data generated in an actual noise environment can be enhanced.

11 Claims, 4 Drawing Sheets

(51) Int. Cl.
  *G10L 15/06* (2013.01)
  *G10L 25/78* (2013.01)
(58) Field of Classification Search
  USPC .......................................................... 704/233
  See application file for complete search history.

(56) References Cited

U.S. PATENT DOCUMENTS

2004/0181410 A1\* 9/2004 Hwang ................. G10L 15/142
  704/256
2015/0058013 A1\* 2/2015 Pakhomov .............. G10L 25/48
  704/243

OTHER PUBLICATIONS

J. Spohrer, P. Brown and R. Roth, "Automatic labeling of speech," ICASSP '82. IEEE International Conference on Acoustics, Speech, and Signal Processing, 1982, pp. 1641-1644, doi: 10.1109/ICASSP.1982.1171490. (Year: 1982).\*

J. Ogata, M. Goto and K. Itou, "The use of acoustically detected filled and silent pauses in spontaneous speech recognition," 2009 IEEE International Conference on Acoustics, Soeech and Signal Processing, 2009, pp. 4305-4308, doi: 10.1109/ICASSP.2009.4960581. (Year: 2009) (Year: 2009).\*

J. Spohrer, P. Brown and R. Roth, "Automatic labeling of speech," ICASSP '82. IEEE International Conference on Acoustics, Speech, and Signal Processing, 1982, pp. 1641-1644, doi: 10.1109/ICASSP.1982.1171490. (Year: 1982) (Year: 1982).\*

\* cited by examiner

| TYPE OF NOISE PARAMETER | RANGE |
|---|---|
| SIGNAL TO NOISE RATIO | 5 TO 25 [DB] |
| REVERBERATION | 100 TO 900 [MS] |
| CLEAN DATA NUMBER NOISE DATA NUMBER RATIO | 0.1 TO 0.7 |
| BACKGROUND NOISE | 0 TO 5 |

TRAINING DATA GENERATING METHOD FOR TRAINING FILLED PAUSE DETECTING MODEL AND DEVICE THEREFOR

CROSS-REFERENCE TO RELATED APPLICATION

Pursuant to 35 U.S.C. § 119(a), this application claims the benefit of earlier filing date and right of priority to Korean Patent Application No. 10-2019-0169887, filed on Dec. 18, 2019, the contents of which are hereby incorporated by reference herein in its entirety.

BACKGROUND

1. Technical Field

The present disclosure relates to a method and device for generating training data for training a filled pause detecting model using a domain randomization algorithm using an enhanced learning algorithm.

2. Description of Related Art

As technology continues to advance, various services using speech recognition technology have been introduced in a number of fields in recent years. Speech recognition technology can be understood as a series of processes of understanding utterances spoken by a speaker and converting the spoken utterance to text data recognizable and usable by computers. Furthermore, the speech recognition services using such speech recognition technology may include a series of processes for recognizing a user's spoken utterance and providing a service appropriate thereto.

When there is delay in the middle of an utterance toward a device having a speech recognition function installed therein, for example, when a user temporarily does not remember a word required to complete the utterance and hesitates, a filled pause occurs. In such a speech recognition environment, in order to effectively process speech recognition even when a filled pause occurs, a device having a speech recognition function installed therein includes a filled pause detector including a filled pause detecting model.

However, when the filled pause detecting model is trained without consideration of a surrounding noise environment, it is difficult to generate a filled pause detector with excellent performance. Thus, a filled pause detecting model needs to be trained using training data in consideration of a noise environment. However, there are issues in that it is not always possible to acquire a large amount of speech data including a filled pause in a similar noise environment to an actual noise environment, and it is difficult to generate a filled pause detector with excellent performance because it is difficult to clearly define the noise environment.

The above-described background technology is technical information that the inventors hold for the derivation of the present disclosure or that the inventors acquired in the process of deriving the present disclosure. Thus, the above-described background technology may not necessarily be regarded as known technology disclosed to the general public prior to the filing of the present application.

SUMMARY OF THE INVENTION

An aspect of the present disclosure is to address issues associated with some related art in which it is not possible to acquire a large amount of speech data including a filled pause generated in a similar noise environment to an actual noise environment, and it is difficult to generate a filled pause detector having excellent performance because it is difficult to clearly define a noise environment.

Another aspect of the present disclosure is to enhance filled pause detection performance for speech data generated in an actual noise environment by generating training data for training a filled pause detecting model in a simulation noise environment.

Still another aspect of the present disclosure is to enhance filled pause detection performance for speech data generated in an actual noise environment by generating training data for training a filled pause detecting model using a domain randomization algorithm of an enhanced learning algorithm.

Yet another aspect of the present disclosure is to address the issues associated with some related art in which it is not possible to acquire a large amount of speech data including a filled pause generated in a similar noise environment to an actual noise environment and it is difficult to generate a filled pause detector having excellent performance because it is difficult to clearly define a noise environment, while using optimum process resources.

A method for generating training data for training a filled pause detecting model according to an embodiment of the present disclosure includes generating training data for training a filled pause detecting model in a simulation noise environment using a domain randomization algorithm of an enhanced learning algorithm.

In detail, the method for generating training data for training a filled pause detecting model according to this embodiment may include acquiring acoustic data including first speech data including a filled pause, second speech data that does not include a filled pause, and noise, the first speech data being labeled as speech data including the filled pause, and the second speech data being labeled as speech data that does not include a filled pause, generating a plurality of noise data based on the acoustic data, and generating first training data including a plurality of filled pauses and second training data that does not include a plurality of filled pauses by synthesizing the plurality of noise data with the first speech data and the second speech data, the first training data being labeled as speech data including a filled pause and the second training data being labeled as speech data that does not include a filled pause.

Through the method for generating training data for training a filled pause detecting model according to this present embodiment, training data for training the filled pause detecting model in a simulation noise environment may be generated, thereby enhancing filled pause detection performance with respect to speech data generated in an actual noise environment.

A training data generating device for training a filled pause detecting model according to another embodiment of the present disclosure may include: an acquirer configured to acquire acoustic data including first speech data including a filled pause, second speech data that does not include a filled pause, and noise, the first speech data being labeled as speech data including a filled pause and the second speech data being labeled as speech data that does not include a filled pause, a first generator configured to generate a plurality of noise data based on the acoustic data, and a second generator configured to generate first training data including a plurality of filled pauses and second training data that does not include a plurality of filled pauses by synthesizing the plurality of noise data with the first speech data and the second speech data, the first training data being labeled as speech data including a filled pause and the second training data being labeled as speech data that does not include a filled pause.

In addition to these embodiments, another method and system for implementing the present disclosure, and a computer-readable recording medium storing a computer program for executing the method may be further provided.

The above and other aspects, features, and advantages of the present disclosure will become apparent from the detailed description of the following aspects in conjunction with accompanying drawings.

According to embodiments of the present disclosure, training data for training a filled pause detecting model in a simulation noise environment can be generated, and filled pause detection performance for speech data generated in an actual noise environment can be enhanced.

Furthermore, a filled pause detector having excellent performance can be generated even when it is not possible to acquire a large amount of speech data including the filled pause generated in a similar noise environment to an actual noise environment.

In addition, a filled pause detector having excellent performance may be generated even when the actual noise environment is not clearly defined.

The effects of the present disclosure are not limited to those mentioned above, and other effects not mentioned may be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," " "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will be omitted.

Figure 1:
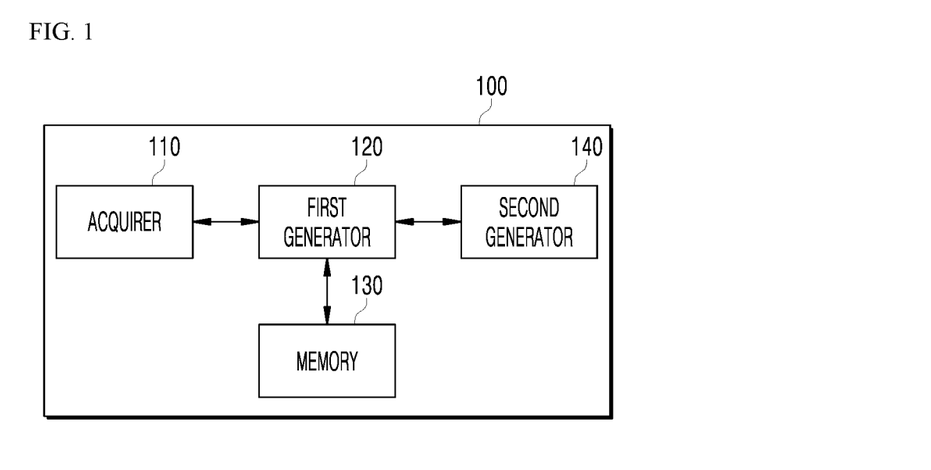
FIG. 1 is a schematic block diagram of a training data generating device for training a filled pause detecting model according to an embodiment of the present disclosure.
Figure 2:
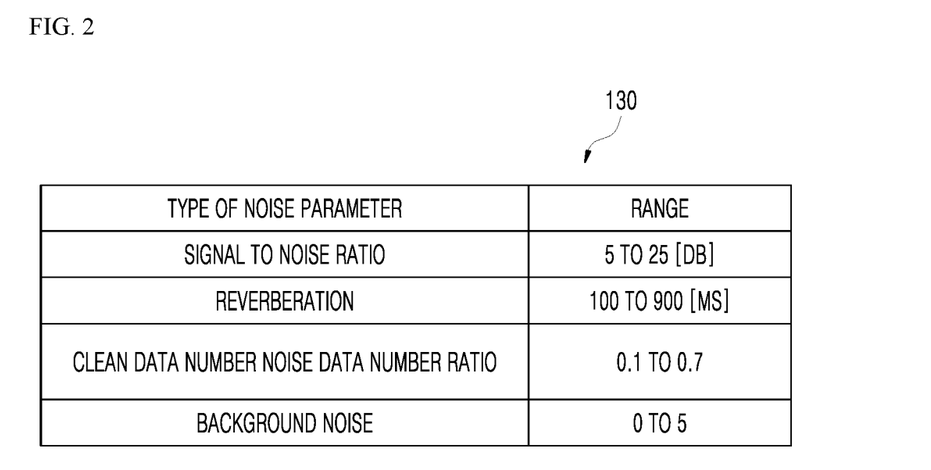
FIG. 2 is a diagram for schematically explaining an information table for generating simulation noise included in the training data generating device of FIG. 1.

FIG. 1 is a schematic block diagram of a training data generating device 100 for training a filled pause detecting model according to an embodiment of the present disclosure. FIG. 2 is a diagram for schematically explaining an information table for generating simulation noise included in the training data generating device 100 of FIG. 1. The training data generating device 100 for training the filled pause detecting model may include an acquirer 110, a first generator 120, a memory 130, and a second generator 140.

According to the present embodiment, the training data generating device 100 may generate training data for training a filled pause detecting model using a domain randomization algorithm of an enhanced learning algorithm.

Conventionally, an arbitrary training model is trained in a simulation environment, but when a training model is operated in an actual environment, an electronic device (such as a robot) having a training model installed therein may encounter a situation which is different from the simulation environment, which may result in an operation failure. In general, such a difference between the simulation environment and the actual environment may be generated due to mismatch between a physical coefficient and inaccurate environment modeling. In this case, when a training model is generated using a domain randomization algorithm, features in the training environment may be randomized, thereby effectively reducing the difference between the simulation environment and the actual environment. That is, the simulation environment having random features may be created using the domain randomization algorithm, and a model may be trained based on the environment. A model based on a domain randomization algorithm may be easily applied to an actual environment because the actual environment is also considered as one sample of various simulation environments.

According to the present embodiment, a filled pause refers to a meaningless interjection that is represented when a user is not capable of smoothly speaking during speech, and may include a nonlinguistic element such as a meaningless syllable or word, for example, "uh", "um", "er", or "erm".

The acquirer 110 may acquire acoustic data including first speech data, second speech data, and noise. Here, the first speech data may be speech data including a filled pause, and the first speech data may be labeled as speech data including the filled pause. The first speech data may be speech data that does not include a filled pause, and the second speech data may be labeled as speech data that does not including a filled pause. In addition, the noise may include white noise, silence, meaningless sound, or the like. According to the present embodiment, the first speech data and the second speech data may be clean data from which noise is not synthesized.

The first generator 120 may generate a plurality of noise data based on the acoustic data. The first generator 120 may set one or more types of a noise parameter required to establish an arbitrary simulation noise environment and may set a range of the one or more set types of the noise parameter.

FIG. 2 is a diagram for schematically explaining an information table for generating simulation noise stored in the memory 130, and illustrates types of noise parameters required to establish an arbitrary simulation noise environment to be generated by the first generator 120, and a range of each noise parameter. For example, in order to generate any one simulation noise, the first generator 120 may a set a signal to noise ratio (SNR), reverberation, a clean data number noise data number ratio, and background noise as the types of the noise parameters of the information table for generating simulation noise.

When setting the range of the types of the noise parameters, the first generator 120 may set the range based on an analysis result of an actual noise sample extracted from an actual noise environment. For example, the first generator 120 may set a range of the SNR as the set noise parameter to 5 to 25 [dB], may set a range of the reverberation as the set noise parameter to 100 to 900 [ms], may set a range of the clean data number noise data number ratio as the set noise parameter to 0.1 to 0.7, and may set a range of the background noise as the set noise parameter to 0 to 5.

The first generator 120 may perform random sampling on an arbitrary noise parameter value of the set range of the noise parameter. The first generator 120 may perform random sampling on a noise parameter value according to uniform distribution having a preset interval between an upper value and a lower value of the range of the noise parameter. For example, the first generator 120 may perform random sampling on a parameter value of the range of the SNR, as a noise parameter set according to uniform distribution, having a preset interval of 10 [dB]. The first generator 120 may perform random sampling on a parameter value of the range of the reverberation, as a noise parameter set according to uniform distribution, having a preset interval of 400 [ms]. The first generator 120 may perform random sampling on a parameter value of the range of the clean data number noise data number ratio, as a noise parameter set according to uniform distribution, having a preset interval of 0.4. The first generator 120 may perform random sampling on a parameter value of the range of the background noise, as a noise parameter set according to uniform distribution, having a preset interval of 4.

According to the present embodiment, the noise parameter value of the actual noise environment may be included in the preset interval. This is because a model based on domain randomization algorithm is easily applied to an actual environment in the above description of the domain randomization algorithm, and the actual environment is also considered as one sample of various trained simulation environments.

The first generator 120 may synthesize the random-sampled noise parameter values to generate noise data of the simulation environment. For example, a first generator 162-1 may synthesize a parameter value 10 [dB] of the random-sampled SNR, a parameter value 400 [ms] of the random-sampled random sampling, a parameter value 0.4 of the random-sampled clean data number noise data number ratio, and a parameter value 4 of the random-sampled background noise to generate noise data of the arbitrary simulation environment.

The memory 130 may store various pieces of information required for an operation of the training data generating device 100. According to the present embodiment, the memory 130 may store the acoustic data acquired by the acquirer 110, the information table for generating simulation noise, the noise data of the simulation environment generated by the first generator 120, and first and second training data that will be described below.

The memory 130 may store a command to be executed by the training data generating device 100, for example, a command for acquiring acoustic data, a command for generating a plurality of noise data, a command for generating training data, or the like.

Herein, the memory 130 may include magnetic storage media or flash storage media, but the scope of the present disclosure is not limited thereto. The memory 130 may include an internal memory and/or an external memory and may include a volatile memory such as a DRAM, a SRAM or a SDRAM, and a non-volatile memory such as one-time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The second generator 140 may synthesize the plurality of noise data generated by the first generator 120 and the first and second speech data acquired by the acquirer 110 to generate first training data and second training data. Here, the first training data may include a plurality of filled pauses, and may be labeled as speech data including the filled pause. The second training data may not include a plurality of filled pauses, and may be labeled as speech data that does not include a filled pause.

Figure 3:
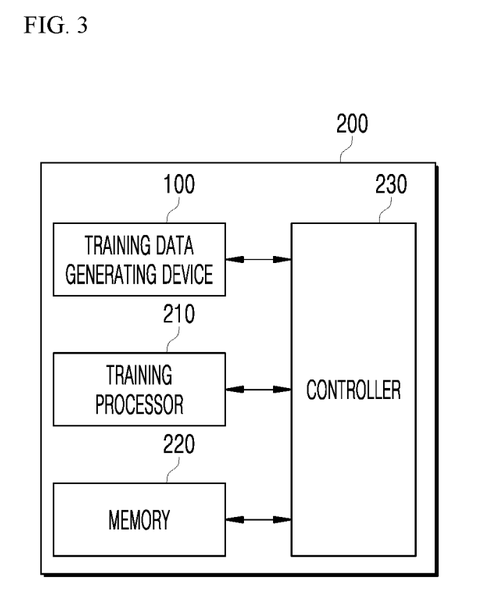
FIG. 3 is a schematic block diagram of a filled pause detector including the training data generating device of FIG. 1 according to an embodiment of the present disclosure.

FIG. 3 is a schematic block diagram of a filled pause detector including the training data generating device of FIG. 1 according to an embodiment of the present disclosure. In the following description, descriptions of parts that are the same as those in FIG. 1 and FIG. 2 will be omitted. Referring to FIG. 3, a filled pause detector 200 may include the training data generating device 100, a training processor 210, a memory 220, and a controller 230.

Here, the training data generating device 100 has been described above with reference to FIGS. 1 and 2, and thus a description thereof is omitted. According to the present embodiment, the training data generating device 100 may be included outside the filled pause detector 200 as shown in FIG. 3, or may be included inside the filled pause detector 200 and operate like the filled pause detector 200.

The training processor 210 may train a deep neural network using the first training data and second training data generated by the training data generating device 100. In order to train the deep neural network, first, the training processor 210 may extract features of the first training data and the second training data. The training processor 210 may extract features of the first training data and the second training data using a log-mel spectrogram. Here, as a method of extracting features of a sound, the log-mel spectrogram algorithm may segment the total data into short times instead of an entire portion of the first training data and the second training data as a target, and may analyze a spectrogram of the corresponding period to extract a feature. First, a speech signal including simulation noise of an input time domain may be segmented into a small-size frame (for example, a frame of 20 to 40 ms). Then, power spectrogram (frequency) of a power spectrogram may be calculated with respect to each frame. Then, Mel filter bank may be applied to the power spectrogram, and energy may be added to each filter. Then, log may be applied to the total filter bank energy.

The training processor 210 may perform classification on the first training data and the second training data using, as input, the first training data and the second training data that are labeled with whether the extracted feature and the filled pause are included. Here, the training processor 210 may perform the aforementioned classification using a CNN algorithm.

The training processor 210 may calculate a loss function indicating a difference between a target value and an estimated value generated as the classification result, and may optimize a weight to minimize the loss function. Here, the training processor 210 may optimize the weight using a stochastic gradient descent algorithm. A stochastic gradient descent algorithm may refer to updating using only a portion of data instead of updating a weight using the total data. In this case, a portion of data may be referred to as Mini-Batch. The stochastic gradient descent algorithm has calculation costs of $O(1)$ with respect to the size of the total data and has a suggestive normalization effect, and thus has an advantage of being appropriate for a non-convex loss function, that is, a loss function with Local Minima.

According to the present embodiment, the training processor 210 may be included outside the controller 230 as shown in FIG. 3, or may be included inside the controller 230 and operate like the controller 230.

The memory 220 may store a filled pause detecting model for detecting whether a filled pause is included in speech information including actual noise through training of the aforementioned deep neural network. In addition, the memory 220 may store various pieces of information and control software required for an operation of the filled pause detector 200.

The controller 230 may be a kind of central processing device, and may drive control software installed in the memory 220 to control the overall operation of the filled pause detector 200.

According to the present embodiment, the controller 230 may detect whether the filled pause is included in speech data including actual noise using the filled pause detecting model stored in the memory 220.

Here, the controller 230 may include a device of any kind capable of processing data, such as a processor. Here, "processor" may, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), and a field programmable gate array (FPGA) may be included, but the scope of the present disclosure is not limited thereto.

According to the present embodiment, the controller 230 may execute an artificial intelligence (AI) algorithm and/or a machine learning algorithm in a 5G communication environment to output an optimum filled pause detection result by the filled pause detector 200.

Here, artificial intelligence (AI) is an area of computer engineering science and information technology that studies methods to make computers mimic intelligent human actions such as reasoning, learning, self-improving, and the like.

In addition, the artificial intelligence does not exist on its own, but is rather directly or indirectly related to a number of other fields in computer science. In recent years, there have been numerous attempts to introduce an element of the artificial intelligence into various fields of information technology to address issues in the respective fields.

Machine learning is an area of AI that includes the field of study that gives computers the capability to learn without being explicitly programmed. Specifically, machine learning may be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from input data.

According to the present embodiment, the controller 230 may perform machine learning such as deep learning on speech data acquired in a simulation environment and/or an actual environment, and the memory 220 may store data used in machine learning, result data, or the like.

Deep learning technology, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN). For example, the deep learning structure may include a deep neural network (DNN), such as a convolutional neural network (CNN), a recurrent neural network (RNN), and a deep belief network (DBN). In the present embodiment, the deep learning structure may use a variety of structures well known to those skilled in the art. For example, the deep learning structure according to the present disclosure may include a CNN, a RNN, and a DBN. RNN is widely used in natural language processing and may configure an artificial neural network structure by building up layers at each instant in a structure that is effective for processing time-series data which vary with time. The DBN may include a deep learning structure that is constructed by stacking the result of restricted Boltzman machine (RBM) learning in multiple layers. A DBN has the number of layers formed by repeating RBM training. A CNN may include a model mimicking a human brain function, built under the assumption that when a person recognizes an object, the brain extracts the most basic features of the object and recognizes the object based on the results of complex processing in the brain.

Further, the artificial neural network may be trained by adjusting weights of connections between nodes (if necessary, adjusting bias values as well) so as to produce a desired output from a given input. Furthermore, the artificial neural network may continuously update the weight values through training. Furthermore, a method of back propagation, for example, may be used in the training of the artificial neural network.

The controller 230 may include an artificial neural network installed therein, and may generate a sentence based on machine learning using one or more of acquired speech or image information as input data.

The controller 230 may include an ANN, for example, a deep neural network (DNN) and train the DNN, and examples of the DNN include CNN, RNN, DBN, and so forth. As a machine learning method for such an ANN, both unsupervised learning and supervised learning may be used. The controller 230 may control so as to update an artificial neural network structure after learning according to a setting.

Figure 4:
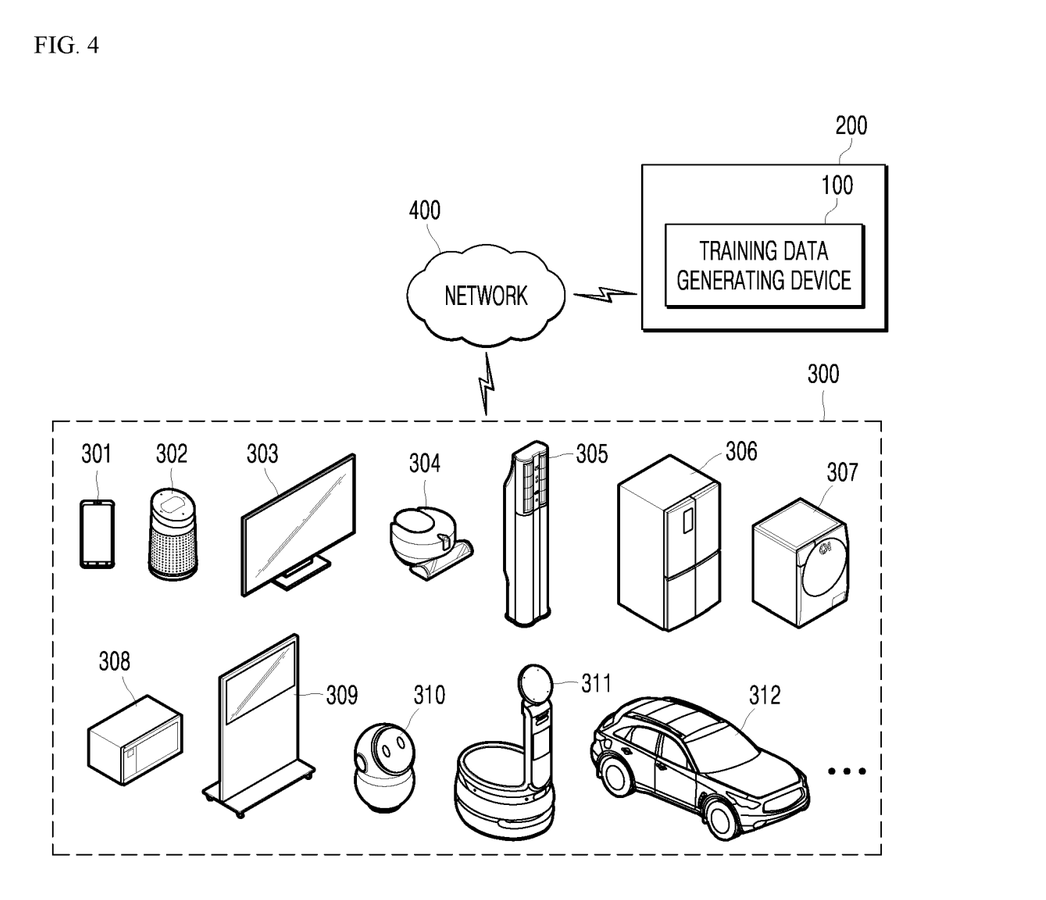
FIG. 4 is a diagram illustrating an example of a filled pause detection environment including a training data generating device, a filled pause detector, an electronic device, and a network for connecting these components according to the an embodiment of the present disclosure.
Figure 5:
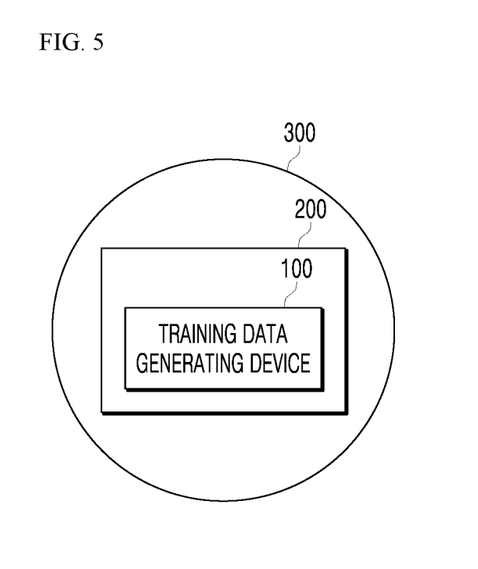
FIG. 5 is a diagram for schematically explaining an example of a training data generating device according to an embodiment of the present disclosure.

FIG. 4 is a diagram illustrating an example of a filled pause detection environment including a training data generating device, a filled pause detector, an electronic device, and a network for connecting these components, according to an embodiment of the present disclosure. FIG. 5 is a diagram for schematically explaining an example of a training data generating device according to an embodiment of the present disclosure. In the following description, descriptions of reference numerals overlapping with those of FIGS. 1 to 3 will be omitted for convenience of description. Referring to FIGS. 4 and 5, the filled pause detection environment may include the filled pause detector 200 including the training data generating device 100, an electronic device 300, and a network 400.

The training data generating device 100 may acquire acoustic data including first speech data that includes a filled pause, second speech data that does not include a filled pause, and noise, may generate a plurality of noise data based on the acoustic data, may synthesize the plurality of noise data, and the first speech data and second speech data, and may generate first training data including a plurality of filled pauses and second training data that does not include a plurality of filled pauses.

The filled pause detector 200 may train a deep neural network using the first training data and second training data generated by the training data generating device 100, and may generate the filled pause detecting model. The filled pause detector 200 may detect whether a filled pause is included in speech data including actual noise using the filled pause detecting model.

According to the present embodiment, the training data generating device 100 may be included inside the filled pause detector 200 as shown in FIG. 5, or the filled pause detector 200 may be included inside the electronic device 300 and the electronic device 300 may operate like the filled pause detector 200. That is, the electronic device 300 may acquire speech data including actual noise and may detect whether a filled pause is included in speech data including actual noise using the filled pause detecting model inside the electronic device 300. The electronic device 300 may include a speech recognition function installed therein for acquiring and outputting speech, performing speech recognition processing on the acquired speech, and transmitting the result as feedback.

The electronic device 300 may include a user terminal 301, an AI speaker 302 that functions as a hub for connecting electronic devices to the network 400, a home appliance such as a television (TV) 303, a robot cleaner 304, an air conditioner 305, a refrigerator 306, a washing machine 307, and a microwave 308, a signage 309 as a display device installed in a public space or a commercial space, a first communication robot 310 installed in a home and performing emotional communication such as gaze, emotional expression, or physical contact, a second communication robot 311 that performs a function of patrol, guidance, cleaning, prevention of epidemics, delivery, or the like in a public space (such as an airport, a hospital, or an office), and various devices corresponding to Internet of things (IoT), such as a vehicle 312. However, the electronic device 300 is not limited to the examples illustrated in FIG. 4.

The user terminal 301 of the electronic device 300 may be a desk top computer, a smartphone, a notebook computer, a tablet personal computer (PC), a smart TV, a cellular phone, a personal digital assistant (PDA) a laptop computer, a media player, a micro server, a global positioning system (GPS) device, an e-book terminal, a digital broadcast terminal, a navigation device, a kiosk, an MP4 player, a digital camera, a home appliance, and other mobile or immobile computing devices, which are manipulated by a user, but is not limited thereto. Furthermore, the user terminal 301 may be a wearable terminal having a communication function and a data processing function, such as a watch, glasses, a hairband, a ring, or the like. The user terminal 301 is not limited to the above-mentioned devices, and thus any terminal that supports web browsing may be used as the user terminal 300.

The network 400 may connect the training data generating device 100, the filled pause detector 200, and the electronic device 300 to each other. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. Furthermore, the network 400 may transmit/receive information using short-range communications and/or long-distance communications. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connection of network elements such as hubs, bridges, routers, and switches. The network 400 may include one or more connected networks, including a public network such as the Internet and a private network such as a secure corporate private network. For example, the network may include a multi-network environment. Access to the network 400 can be provided via one or more wired or wireless access networks. Furthermore, the network 400 may support the Internet of things (IoT) for 5G communication or exchanging and processing information between distributed elements such as objects.

Figure 6:
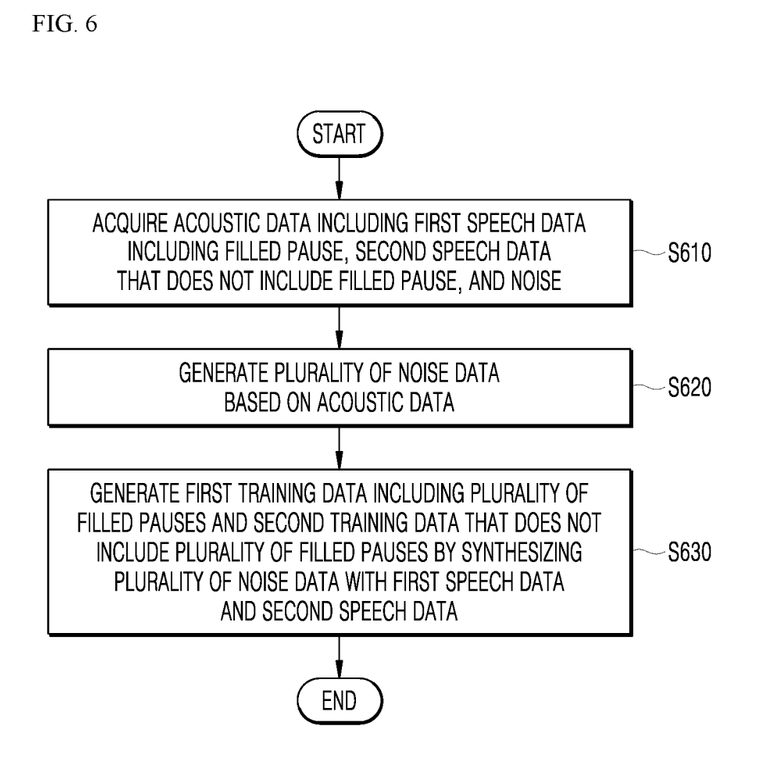
FIG. 6 is a flowchart for explaining a method for generating training data for training a filled pause detecting model according to an embodiment of the present disclosure.

FIG. 6 is a flowchart for explaining a method for generating training data for training a filled pause detecting model according to an embodiment of the present disclosure. Hereinbelow, a repeated description of the common parts previously described with reference to FIG. 1 through FIG. 5 will be omitted.

In operation S610, the training data generating device 100 may acquire acoustic data including first speech data, second speech data, and noise.

Here, the first speech data may be speech data including a filled pause, and may be labeled as speech data including a filled pause. In addition, the second speech data may be speech data that does not include a filled pause, and may be labeled as speech data that does not include a filled pause. In addition, the noise may include white noise, silence, meaningless sound, or the like. According to the present embodiment, the first speech data and the second speech data may be clean data from which noise is not synthesized In operation S620, the training data generating device 100 generate a plurality of noise data based on the acoustic data.

The training data generating device 100 may set one or more types of a noise parameter required to establish an arbitrary simulation noise environment, and may set a range of the one or more set types of the noise parameter using an information table for generating simulation noise. When setting the range of the types of the noise parameter, the training data generating device 100 may set the range based on an analysis result of an actual noise sample extracted from an actual noise environment. The training data generating device 100 may perform random sampling on an arbitrary noise parameter value of the set range of the noise parameter. The training data generating device 100 may perform random sampling on a noise parameter value according to uniform distribution having a preset interval between an upper value and a lower value of the range of the noise parameter. Here, the noise parameter value of the actual noise environment may be included in the preset interval. The training data generating device 100 may synthesize the random-sampled noise parameter values to generate noise data of the simulation environment.

In operation S630, the training data generating device 100 may synthesize the plurality of generated noise data with the acquired first speech data and second speech data to generate first training data and second training data.

Here, the first training data may include a plurality of filled pauses, and may be labeled as speech data including a filled pause. In addition, the second training data may not include a plurality of filled pauses, and may be labeled as speech data that does not include a filled pause.

The exemplary embodiments described above may be implemented through computer programs executable through various components on a computer, and such computer programs may be recorded in computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for generating training data for training a filled pause detecting model, the method comprising:
    acquiring acoustic data comprising first speech data including a filled pause, second speech data that does not include a filled pause, and noise, wherein the first speech data is labeled as speech data including a filled pause and the second speech data is labeled as speech data that does not include a filled pause;
    generating a plurality of noise data based on the acoustic data by:
    setting one or more types of noise parameters for establishing a simulation noise environment,
    setting a range of the one or more types of the noise parameters,
    performing random sampling on an arbitrary noise parameter value of the set range of the noise parameters, and
    generating the plurality of noise data by synthesizing the random-sampled noise parameter value; and
    generating first training data including a plurality of filled pauses and second training data that does not include a plurality of filled pauses by synthesizing the plurality of noise data with the first speech data and the second speech data,
    wherein the first training data is labeled as speech data including a filled pause and the second training data is labeled as speech data that does not include a filled pause, and
    wherein the first training data and the second training data are generated using a domain randomization algorithm.

2. The method of claim 1, wherein the acquiring the acoustic data comprises acquiring clean data from which noise is not synthesized with respect to the first speech data and the second speech data.

3. The method of claim 1, wherein the setting the range of the one or more types of the noise parameters comprises setting the range based on an analysis result of an actual noise sample extracted in an actual noise environment.

4. The method of claim 1, wherein the performing the random sampling comprises performing the random sampling on a noise parameter value according to uniform distribution having a preset interval between an upper value and a lower value in the range of the noise parameters.

5. The method of claim 4, wherein the noise parameter value of an actual noise environment is included in the preset interval.

6. A non-transitory computer-readable recording medium on which a program for executing a method of generating training data for training a filled pause detecting model, the method comprising:
acquiring acoustic data comprising first speech data comprising a filled pause, second speech data that does not comprise a filled pause, and noise, wherein the first speech data is labeled as speech data comprising a filled pause and the second speech data is labeled as speech data that does not comprise a filled pause;
generating a plurality of noise data based on the acoustic data by:
setting one or more types of noise parameters for establishing a simulation noise environment,
setting a range of the one or more types of the noise parameters,
performing random sampling on an arbitrary noise parameter value of the set range of the noise parameters, and
generating the plurality of noise data by synthesizing the random-sampled noise parameter value; and
generating first training data comprising a plurality of filled pauses and second training data that does not comprise a plurality of filled pauses by synthesizing the plurality of noise data with the first speech data and the second speech data, wherein the first training data is labeled as speech data comprising a filled pause and the second training data is labeled as speech data that does not comprise a filled pause, wherein the first training data and the second training data are generated using a domain randomization algorithm.

7. A training data generating device for training a filled pause detecting model, comprising:
an acquirer configured to acquire acoustic data comprising first speech data including a filled pause, second speech data that does not include a filled pause, and noise, wherein the first speech data is labeled as speech data including a filled pause and the second speech data is labeled as speech data that does not include a filled pause;
a first generator configured to generate a plurality of noise data based on the acoustic data by:
setting one or more types of noise parameters required to establish a simulation noise environment,
setting a range of the one or more types of the noise parameters,
performing random sampling on an arbitrary noise parameter value of the set range of the noise parameters, and
generating the plurality of noise data by synthesizing the random-sampled noise parameter value; and
a second generator configured to generate first training data including a plurality of filled pauses and second training data that does not include a plurality of filled pauses by synthesizing the plurality of noise data with the first speech data and the second speech data, wherein the first training data is labeled as speech data including a filled pause and the second training data is labeled as speech data that does not include a filled pause, wherein the first training data and the second training data are generated using a domain randomization algorithm.

8. The training data generating device of claim 7, wherein the acquirer is configured to acquire clean data from which noise is not synthesized with respect to the first speech data and the second speech data.

9. The training data generating device of claim 7, wherein the first generator is configured to set the range based on an analysis result of an actual noise sample extracted in an actual noise environment.

10. The training data generating device of claim 7, wherein the first generator is configured to perform the random sampling on a noise parameter value according to uniform distribution having a preset interval between an upper value and a lower value in the range of the noise parameters during the random sampling of the noise parameter value.

11. The training data generating device of claim 10, wherein the first generator is configured to include the noise parameter value of an actual noise environment in the preset interval.

* * * * *